(12) United States Patent
Winget et al.

(10) Patent No.: US 8,381,268 B2
(45) Date of Patent: Feb. 19, 2013

(54) NETWORK AUTHORIZATION STATUS NOTIFICATION

(75) Inventors: Nancy Cam Winget, Mountain View, CA (US); Joseph A. Salowey, Seattle, WA (US); James Edward Burns, Stratham, NH (US); Susan Elizabeth Thomson, Summit, NJ (US); Hao Zhou, Solon, OH (US)

(73) Assignee: Cisco Technology, Inc., San Jose, CA (US)

( * ) Notice: Subject to any disclaimer, the term of this patent is extended or adjusted under 35 U.S.C. 154(b) by 669 days.

(21) Appl. No.: 12/115,677

(22) Filed: May 6, 2008

(65) Prior Publication Data

US 2008/0282327 A1 Nov. 13, 2008

Related U.S. Application Data

(60) Provisional application No. 60/917,451, filed on May 11, 2007.

(51) Int. Cl.
*G06F 7/04* (2006.01)

(52) U.S. Cl. ............ 726/4; 713/183; 726/2; 726/5; 726/14; 709/223; 709/224; 709/225; 455/411

(58) Field of Classification Search ............ 726/2, 4–5, 726/14; 713/201, 183; 455/411; 709/223–225
See application file for complete search history.

(56) References Cited

U.S. PATENT DOCUMENTS

| | | | | |
|---|---|---|---|---|
| 5,109,486 A | * | 4/1992 | Seymour | 709/224 |
| 6,115,821 A | * | 9/2000 | Newby et al. | 726/21 |
| 6,219,790 B1 | | 4/2001 | Lloyd et al. | |
| 7,492,720 B2 | * | 2/2009 | Pruthi et al. | 370/252 |
| 7,949,871 B2 | * | 5/2011 | Randle et al. | 713/153 |
| 8,014,756 B1 | * | 9/2011 | Henderson | 455/411 |
| 2003/0105959 A1 | | 6/2003 | Matyas, Jr. et al. | |
| 2004/0078571 A1 | | 4/2004 | Haverinen | |
| 2005/0172117 A1 | | 8/2005 | Aura | |
| 2005/0210252 A1 | | 9/2005 | Freeman et al. | |

OTHER PUBLICATIONS

Privacy-Aware Access Control and Authorization in Passive Network Monitoring Infrastructures Gogoulos, F.; Antonakopoulou, A.; Lioudakis, G.V.; Mousas, A.S.; Kaklamani, D.I.; Venieris, I.S. Computer and Information Technology (CIT), 2010 IEEE 10th International Conference on (978-1-4244-7547-6) 2010. p. 1114-1121.*
IM-DB: Information retrieval system for interactive network-status analysis Terauchi, A.; Akashi, O.; Fukuda, K. Network Operations and Management Symposium (NOMS), 2010 IEEE (1542-1201) (978-1-4244-5366-5) 2010. p. 922-925.*
Collecting network status information for network-aware applications Miller, N.; Steenkiste, P. INFOCOM 2000. Nineteenth Annual Joint Conference of the IEEE Computer and Communications Societies. Proceedings. IEEE (0743-166X) (0-7803-5880-5) 2000. vol. 2;p. 641-650 vol. 2.*
T. Dierks and C. Allen. The TLS Protocol, Version 1.0. Jan. 1999. http://www.ietf.org/rfc/rfc2246.txt. Last accessed Jan. 15, 2007.

(Continued)

*Primary Examiner* — Thanhnga B Truong
*Assistant Examiner* — Angela Holmes
(74) *Attorney, Agent, or Firm* — Schwegman, Lundberg & Woessner, P.A.

(57) ABSTRACT

A system that enables network authorization status to be conveyed to the device requesting network services within or outside the scope of an authentication exchange is provided. The authorization status notification or information can be automatically generated or otherwise triggered by a request from the user or device. For instance, a query can be employed to solicit device authorization status related to a particular service or group of services. Additionally, authorization status notification can be automatically triggered based upon a change in the device authorization state.

15 Claims, 10 Drawing Sheets

OTHER PUBLICATIONS

S. Blake-Wilson, et al. Transport Layer Security (TLS) Extensions. Jun. 2003. http://www.ietf.org/rfc/rfc3546.txt. Last accessed Jan. 15, 2007.

International Search Report for International Patent Application No. PCT/US07/68105 dated Feb. 27, 2007, 3 pages.

* cited by examiner

NETWORK AUTHORIZATION STATUS NOTIFICATION

CROSS-REFERENCE TO RELATED APPLICATIONS

This application claims the benefit of U.S. Provisional Patent application Ser. No. 60/917,451 entitled "NETWORK AUTHORIZATION STATUS" and filed May 11, 2007. The entirety of the above-noted application is incorporated by reference herein.

BACKGROUND

Today, there continues to be an increase in the prevalence and utility of computer and communication networks. Increased connectivity has allowed people rapid access to vast amounts of information and services, whether through the Internet, intranets or other networks. Increased data accessibility continues to impact the behavior of organizations as well as individuals. For example, people utilize the Internet for diverse functions such as research, news, banking, correspondence and other uses too numerous to list.

Availability of wireless devices and networks has also increased the utility of networks. Many people utilize a mobile device, such as a cellular phone or smartphone, as a primary means of communication. In addition, functionality of such devices has increased to allow users to access voice-over-Internet-protocol ("VoIP") phone service, software applications, email access, Internet access and the like.

This unprecedented access to data and services has also led to various security problems. Enhanced accessibility of banking and credit information is connected to increase in profitability as well as frequency of identity theft. Additional security concerns include privacy of communications (e.g., telephone conversations, email, instant messaging, text messaging and the like). Network customers often expect and rely on network security to protect their data and communications. At the same time, the customers expect rapid and cost-effective communication and frequently real-time transmission of data.

The foundation of network security is the authentication of network entities. 'Authentication' refers to the validation of the claimed identity of an entity, such as a device, which is attaching to a network, or validation that a user, who is requesting network services, is a valid user of the network services requested. Authentication is often accomplished via the presentation of an identity and credentials (e.g., digital certificates or shared secrets). Initial authentication is typically performed for network admission control by a provider edge (PE) device (e.g., router, switch) when a consumer device such as a cable modem or mobile cellular handset connects to a service provider's network.

The effectiveness of other network security mechanics such as authorization, integrity check and confidentiality rely upon network entity authentication as well as continuity of service. 'Authorization' refers to an act of granting a device or user access to specific types of resources and/or services. This grant of access can be based upon a number of factors, including user authentication, services requested, device type, current system state, etc. As well, authorization can be restricted in a variety of manners, for example, scope of use, temporal restrictions, physical location restrictions, etc.

DESCRIPTION

Overview

Figure 1:
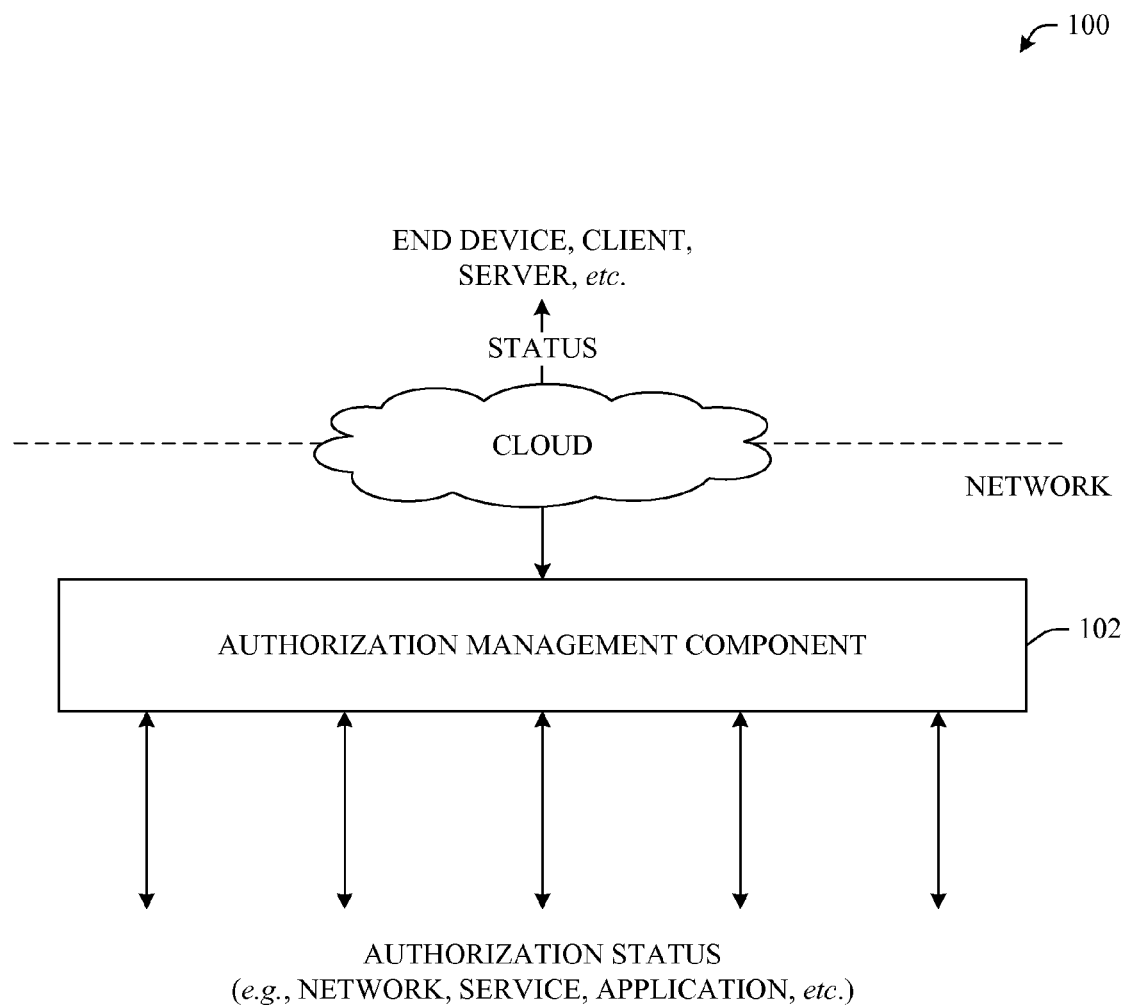
FIG. 1 illustrates a block diagram of an example system that provides authorization status in accordance with one or more embodiments of the specification.

The following presents a simplified overview in order to provide a basic understanding of some embodiments described herein. This is not an extensive overview of the embodiments described herein. It is intended to neither identify key or critical elements of the embodiments nor to delineate the scope of the specification. Its sole purpose is to present some concepts of the claimed subject matter in a simplified form as a prelude to the more detailed description of example embodiments that is presented later.

The specification, in one aspect, relates to systems and methods that enable a client to be notified of and/or query for authorization status. For example, a message can be sent by an authenticator to a client when a particular network authorization scope changes. Additionally, a client can request authorization status from an authenticator. In accordance with the specification, this notification can be sent within or, alternatively, outside (e.g., before or after) the scope of the authentication exchange.

As used herein, the authorization notification can include, but is not limited to include, network name, authorization profile name, access level, whether communication is permitted, whether provisioning is permitted, whether remediation access is allowed, reason for restricted access, whether full access is allowed, whether limited access is allowed, what type of access is permitted, the quality of service provided or the scope of the authorization lifetime. This authorization management functionality can be embodied within an AAA (authentication, authorization and accounting) server, a network access device such as a router or a switch or a network-based application server. Additionally, multiple authorization management components can be employed as desired or appropriate.

While the aspects described herein are directed to authorizations granted by a network or service, it is to be understood that the features, functions and benefits described herein can also be applied to authorization status granted by an end device (e.g., client, supplicant), for example, to a network. In other words, just as a network authorizes an end device, the end device can authorize the network as well. In these examples, the authorization status can be determined and conveyed as appropriate or desired.

In still other aspects, the specification discloses a query and response protocol that enables a user or client device (e.g., supplicant) to check status of authorization permissions. This authorization query response and indicators may be cryptographically or otherwise protected. Still further, the authenticator can be equipped with controls to toggle the functionality on/off as desired or appropriate.

In aspects, the client device may take action based upon the authorization status or the result of a query. For instance, the device can attempt remediation, re-authentication, enrollment, or the like as a function of the status or a query response. This action can be manually triggered or automatic, for example, based upon a pre-defined policy, preference or inference. Machine learning and reasoning mechanisms can be employed to automate actions on behalf of a user, for example, based upon historical or statistical analysis.

The following description and the annexed drawings set forth certain illustrative embodiments. These embodiments may be indicative, however, of but a few of the various ways in which the principles of the disclosed technology may be employed and are intended to include many and/or all such embodiments and their equivalents. Other advantages and novel features of the technology will become apparent from the following description of example embodiments when considered in conjunction with the drawings.

DESCRIPTION OF EXAMPLE EMBODIMENTS

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As utilized herein, the terms 'component,' 'system,' 'interface,' 'message,' 'protocol,' 'communications,' and the like can refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term 'article of manufacture' as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Many modifications may be made to this configuration without departing from the scope or spirit of the claimed subject matter.

As used herein, the terms to 'infer' or 'inference' refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

With reference now to the drawings, FIG. 1 illustrates a system 100 that enables authorization status and information to be automatically or selectively conveyed. System 100 can generally include an authorization management component 102 that facilitates authorization status to be conveyed or communicated to an end device, client, server or the like. As used herein, authorization status can refer to permissions regarding networks, services, applications as well as other applicable resources.

Typically, authentication and authorization occur when a terminal, client device or supplicant begins communication with a network. It will be understood that, in an authentication system, a 'supplicant' refers to a client machine that desires to gain access to a network, services and/or application services. 'Authentication' refers to the validation of the claimed identity of an entity, such as a device, which is attaching to a network, or a user, who is requesting network services. Authentication is typically accomplished via the presentation (or discovery) of an identity and credentials. 'Credential' refers to most any data or evidence that can be used to verify identity and/or rights (e.g., digital certificates or shared secrets).

'Authorization' refers to the granting of access to specific types of services, applications, as well as, networks, to a device or user. This grant of access can be based upon a number of factors, including, but not limited to, user or device authentication, services requested, current system state, etc. As well, 'authorization' can be restricted in a variety of manners, for example, scope of use, temporal restrictions, physical location restrictions, etc.

'Authentication' of a terminal is most often performed in a process during network admission. In operation, once a terminal (e.g., client, supplicant, end device) has properly established its identity in an initial authentication process, a trust relationship is established between the terminal and the network, for example, the network access device. To access services offered by a service provider, the terminal can establish a trust relationship with other entities in the service provider's network.

Establishing a trust relationship between the terminal and other entities is sometimes a difficult problem. Oftentimes, the trust relationships are based upon long term credentials and associated information between the terminal and an authentication, authorization and accounting (AAA) server. An AAA server is often employed as a part of the network security architecture with respect to applications such as network access or IP (Internet Protocol) mobility and can utilize authorization and authentication protocols, such as EAP (Extensible Authentication Protocol), RADIUS (Remote Authentication Dial In User Service), Diameter, among others.

Conventional systems often require multiple message exchanges each time authentication to a network application server (e.g., service) is requested. For example, EAP is a universal authentication framework widely used in wireless networks to effectuate authentication. It will be understood that the EAP protocol is not limited to wireless applications. In other words, EAP may also be implemented in wired applications. Moreover, 'null' authentication is sometimes employed to authenticate a supplicant. In a 'null' authentication scheme, the AAA server may validate an entity (e.g., supplicant) merely based upon the entity's MAC (media access control) or port address, or provide limited access to anyone that does not execute any 'authentication' protocol (e.g., EAP or otherwise). It is to be understood that this 'null' authentication is an alternative form of authentication for at least providing authorization in the absence of a 'true' authentication exchange.

'EAP' refers to an authentication framework rather than a specific authentication mechanism. EAP provides some common functions and negotiation of desired authentication mechanisms. Most often, these authentication mechanisms are commonly referred to generally as EAP methods. Some of these specific methods used in wireless applications include, but are not limited to, EAP-TLS, EAP-SIM, EAP-AKA, and EAP-FAST.

When EAP is invoked by an 802.1X enabled network access device such as an 802.11 a/b/g wireless access point, a secure authentication mechanism can be provided and negotiated to establish authorization for network access and to establish a secure cryptographic keying material between the client and network access device. This cryptographic keying material can then be used for an encrypted session thereby cryptographically protecting traffic transmitted between the devices.

It is to be understood that the innovation discloses using key material derived from exchanges such as 802.1X, 802.11, EAPoUDP, or IKE to protect the messages. For example, if data protection is used then these messages may be protected as regular data or specific key material may be derived from the exchange to secure these message (e.g., such as keys derived from EAP EMSK or the 0.11 KCK). A second example method can be employed which is independent of data protection. In many cases these two example approaches will be equivalent since the authenticator terminates the data protection and generates the authorization messages. It will be understood that it is most often advantageous for the messages to be encrypted.

The authorization management component 102 enables authorization status to be conveyed to (or requested from) an end device such as a client device, server, etc. As described supra, the status can convey authorization status to a network or resource within the network, e.g., services, applications. As will be described in accordance with the figures that follow, the authorization management component 102 can be embodied within an AAA server, an edge device (e.g., router, switch), application server, etc. Additionally, in other aspects, the authorization management component 102 can be a standalone component as illustrated in FIG. 1. Each of these alternative aspects is to be included within the scope of this disclosure and claims appended hereto.

Figure 2:
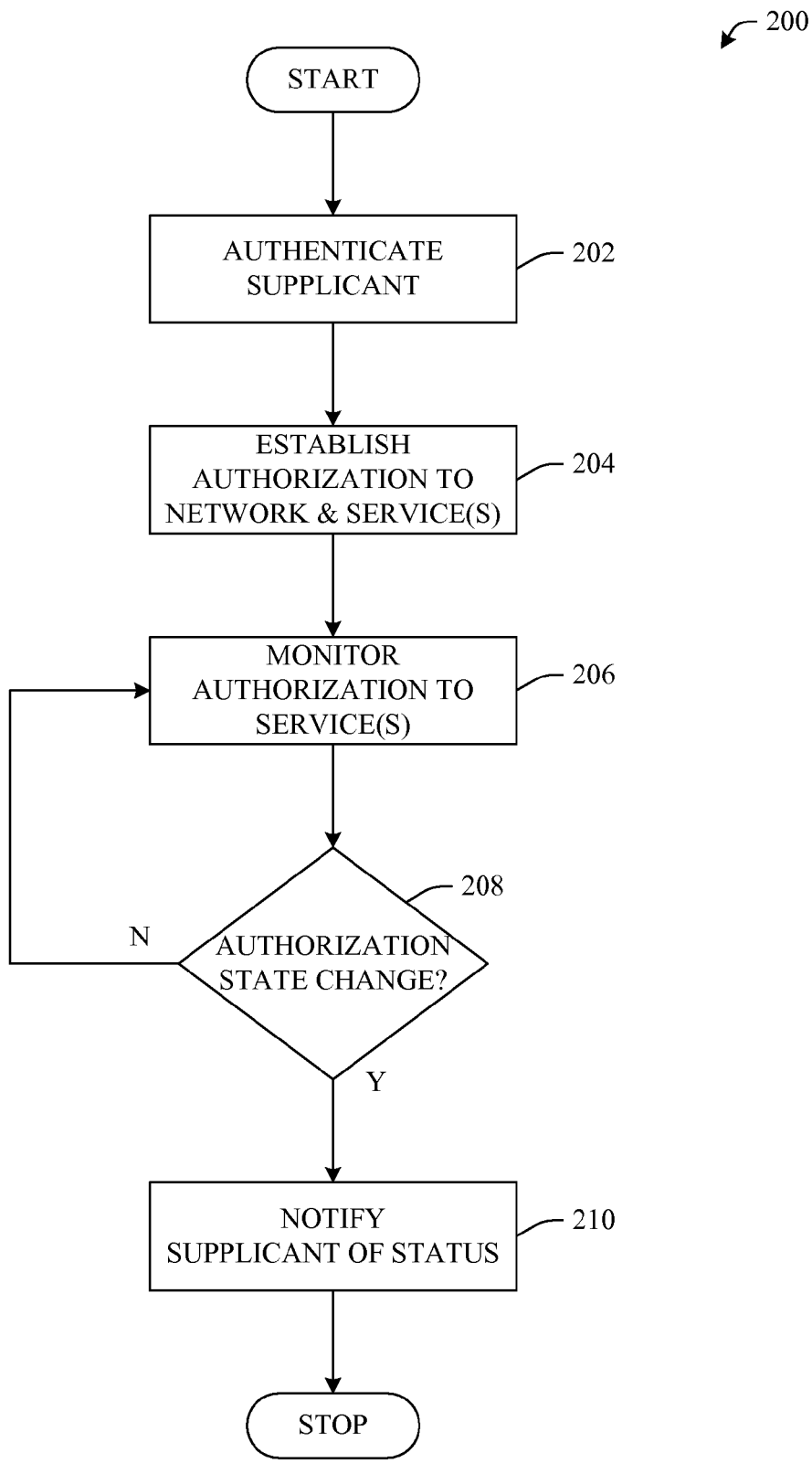
FIG. 2 illustrates a flowchart of an example methodology for monitoring and providing authorization status in accordance with an aspect of the specification.

Referring now to FIG. 2, a methodology 200 for notifying a supplicant of authorization status is illustrated. While, for purposes of simplicity of explanation, the one or more methodologies shown herein, e.g., in the form of a flow chart, are shown and described as a series of acts, it is to be understood and appreciated that the subject specification is not limited by the order of acts, as some acts may, in accordance with the specification, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the specification. It is to be understood that, although FIG. 2 illustrates notification to a supplicant, it will be understood that other aspects exist whereby notification can be provided to other entities such as, pre-authenticated client devices, network management servers, monitoring servers or the like.

At 202, a supplicant can be authenticated for access to a network. Here, handshake protocols and message exchanges can be employed to validate credentials associated to the supplicant. Next, authorization to services within and including the network can be established at 204. It is to be understood that authorization can be limited based upon any subset of available services as well as based upon access to scope of services. Still further, although not illustrated, it is to be understood that a client may query for status before attempting authentication to see if there is open access. The client may then be notified of its authorizations, for example that its authorizations have been limited only to remediation functions if a virus is detected. These aspects are to be included within the scope of this disclosure and claims appended hereto.

The authorization state or status can be monitored at 206. For instance, the system can dynamically monitor the availability of services for which authorization is granted. The monitoring can be in real-time (or near real-time), based upon a predefined schedule or as otherwise desired. The monitoring may be based on locally available data or data received from a remote entity. In accordance with the authorization status, at 208, a determination is made to evaluate if the authorization state has changed. If status did not change, the flow returns to 206 and resumes monitoring status.

However, if authorization status has changed, the supplicant can be notified of the status at 210. For example, the status can include the name or identity of a currently attached network. In other aspects, the status information can include whether any communication, provisioning, remediation access, full access, limited access or the like is permitted. Additionally, the status can identify what type of access is permitted as well as the lifetime of the authorization. It is to be understood that this notification can include most any relevant information as desired.

In still other aspects, the notification can provide remedial measures that address or modify an authorization state or issue. In one specific example, the notification can suggest a reboot in order to re-establish service authorization upon detecting an issue with the previous authorization. In other examples, the supplicant can take other action based upon the result such as, but not limited to, attempt remediation, re-authentication, enrollment, etc. As will be described below, machine learning and reasoning (MLR) as well as rules-based technologies can be employed to take action on behalf of a user (or enterprise) in view of a particular state.

Although the flow diagram illustrated in FIG. 2 triggers notification of status based upon a change in authorization status, it is to be understood that, in other aspects, a user can trigger notification by way of a query or other appropriate action. For instance, if a user desires to verify or check status at any given time (e.g., before, during or after authentication), a status request can be established and employed to prompt notification from an appropriate authenticator (e.g., AAA server). An example methodology of processing a supplicant authorization status request or query is illustrated in FIG. 3.

Figure 3:
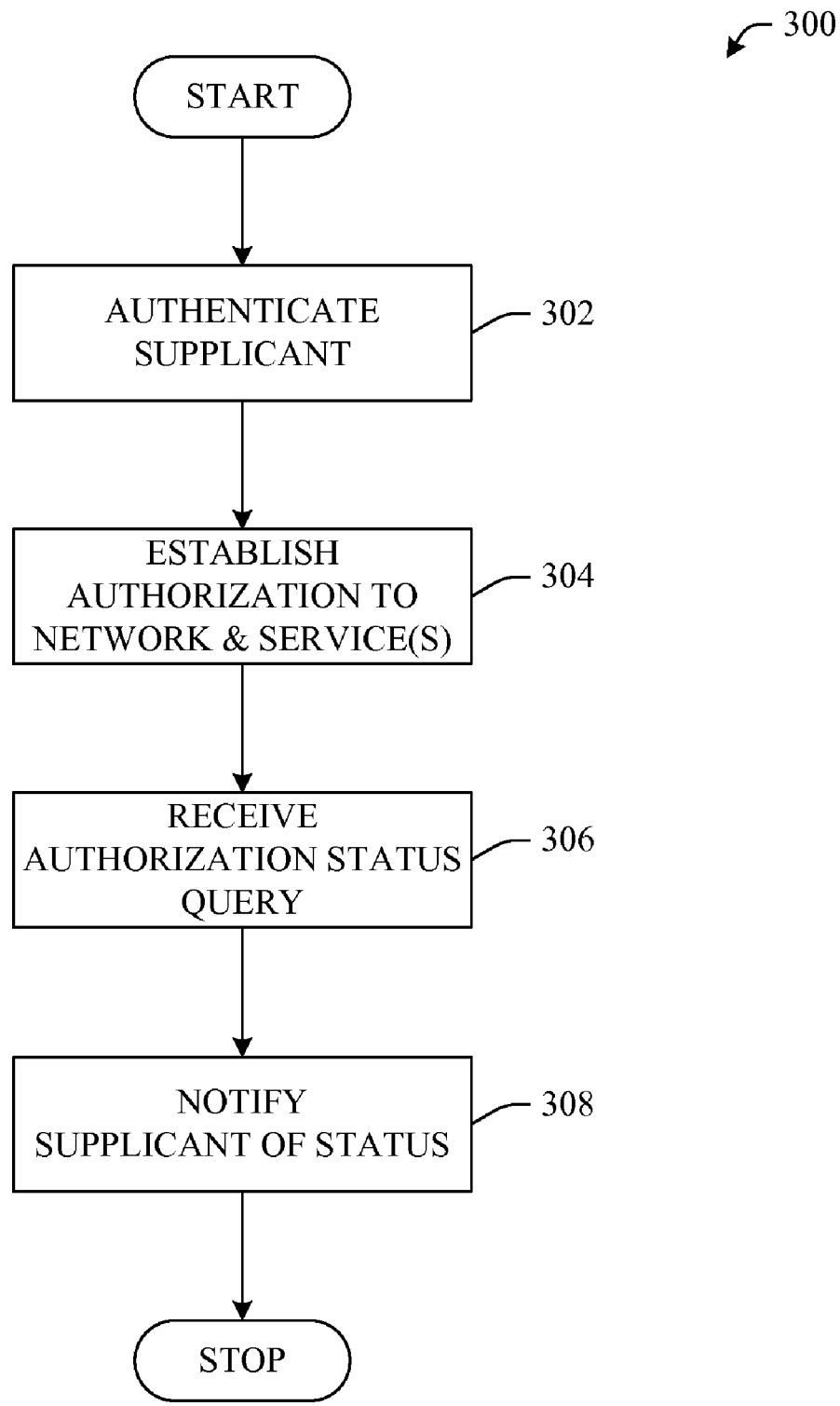
FIG. 3 illustrates a flowchart of an example methodology of processing a query for authorization status in accordance with an aspect of the specification.

Turning to FIG. 3, a supplicant can be authenticated at 302. Next, authorization can be granted at 304 which enables a supplicant to access the network and one or more resources available within the subject network, e.g., services, applications. A query (or request) for authorization status can be received at 306. For example, a supplicant can transmit a query for authorization status to an authenticator which, at 308, can trigger notification of the supplicant's current authorization status. As described above, the notification can convey most any information that identifies authorization status as well as any changes thereto. Additionally, it is possible for the notification to include identification of resources which are available to a supplicant. Although FIG. 3 illustrates a supplicant that requests authorization status after authentication, it is to be understood that other aspects enable requests for authorization status before and/or during the authentication process.

As stated supra, the specification contemplates an MLR component and/or rules-based mechanism which facilitate automating one or more features in accordance with the subject specification. The subject specification (e.g., in connection with querying authorization state or prompting action based upon a state) can employ various MLR-based schemes for carrying out various aspects thereof.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject specification can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to query for authorization status, which services to select to prompt status notification, what actions to take in response to a particular status and/or context, etc.

Figure 4:
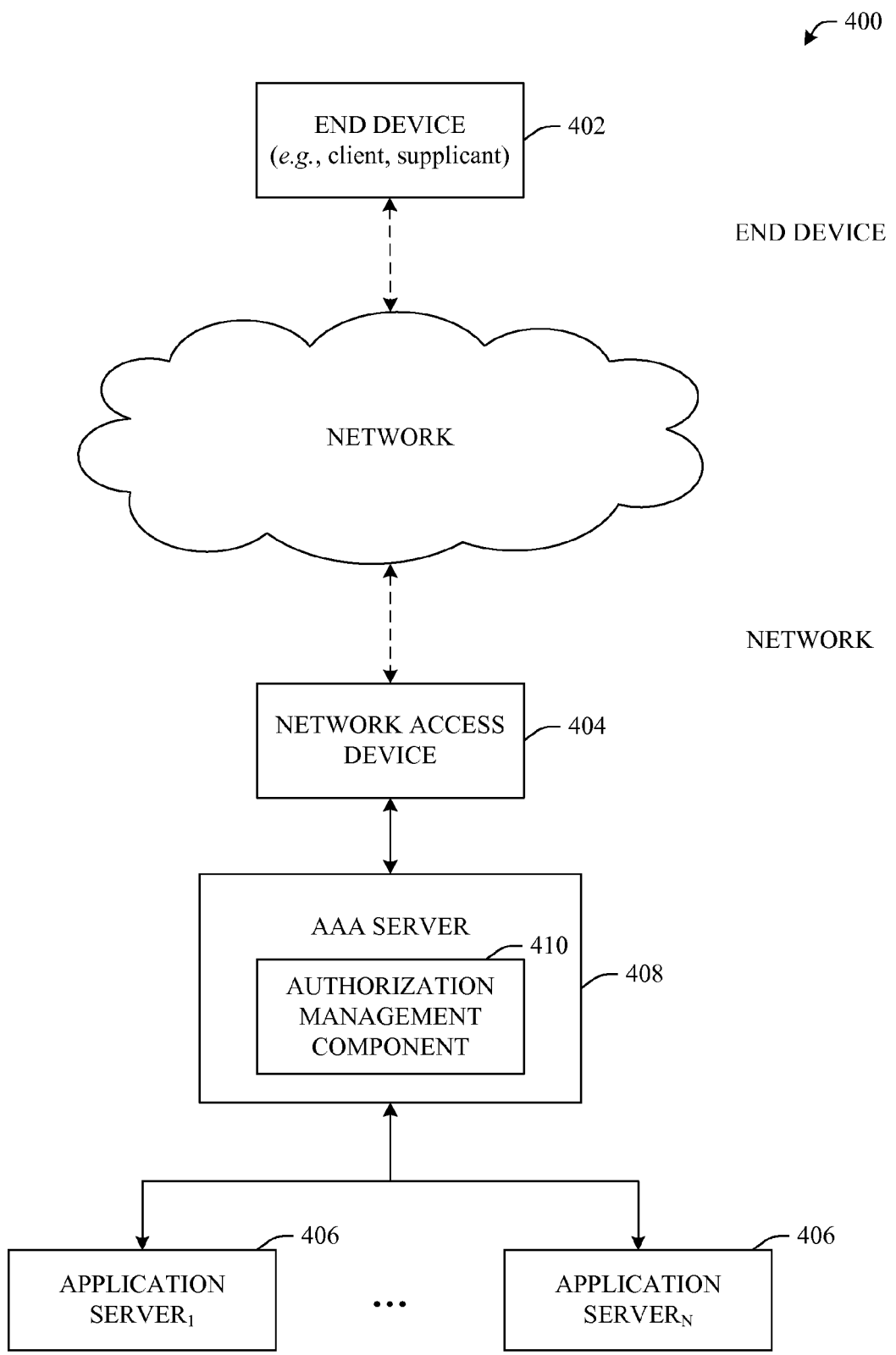
FIG. 4 illustrates a block diagram of an example system that embodies an authorization management component within an AAA (authentication, authorization and accounting) server.

Turning to FIG. 4, illustrated is a system 400 that facilitates secure communication between one or more supplicants, clients or end devices 402, one or more network access devices 404 (e.g., edge device, router, switch), and one or more application servers 406. As will be understood, the network access device 404 provides basic access to the network. As shown, the network can include one or more application servers 406 that can provide network services (e.g., IP mobility services, telephone services) to end devices 402.

In operation, an end device 402 can communicate with a network access device 404 to gain access to the network. The network access device 404 can proxy the conversation to an AAA server 408 to initiate a session and authenticate to the network. As illustrated in FIG. 4, the network access device 404 can be independent of the AAA server 408. Alternatively, the network access device 404 and AAA server 408 can be collocated. Other embodiments, an authorization management component 410 can tap or communicate with other authorization servers (not shown) to obtain appropriate authorizations. This alternative aspect will be discussed with reference to FIG. 6 that follows.

Additionally, although a single end device 402 is shown, it is to be appreciated that multiple devices, servers or supplicants can communicate with a single network access device 404 and a single AAA server 408. As shown, the AAA server 408 can include an authorization management component 410 which can perform network authentication and specifically, service authorization of the terminal 402, including, but not limited to, verifying a user password, verifying a credential(s), and the like. In particular, the AAA server 408 can include the authorization management component 410 that performs authorization of terminals 402 to application servers 406. In addition, the authorization management component 410 can dynamically monitor authorization status of each end device 402 thereby providing the status information as desired, or requested. Additionally, it is to be understood that the authorization management component 410 can also dynamically monitor, query and/or communicate with other authorization agents (not shown) in alternative embodiments of the specification.

In specific aspects, the authorization management component 410 can actively advise an end user 402 of an authorization status. In other aspects, a user (or end device 402) can query the authorization management component 410 to obtain authorization status with respect to an application server 406 or group of application servers 406. In turn, the authorization management component 410 can convey this information to the requesting entity, e.g., end device, server. In other aspects, if the status information is not known upon receiving the request, the authorization management component 410 can communicate with the appropriate device(s) or entities in order to establish the applicable state. Once established, this information can be conveyed to the requester.

In addition to identification of a user and terminal 402, authentication can include an evaluation of the terminal 402. For instance, the terminal device type, configuration and contents can be assessed to determine whether there are any viruses on the terminal 402, the current version of software running on the terminal 402 and/or terminal hardware capabilities. Authorization for certain services may be unavailable based upon the capabilities of either the software or hardware. Additionally, a terminal 402 may be denied access to the network or quarantined if a virus is detected. Here, the authorization management component 410 can evaluate the requester or end device to establish this information. Accordingly, appropriate action can be determined (or inferred) based upon the result of the evaluation.

The AAA server component 408 (and authorization management component 410) can also determine services for which the user and terminal are authorized. The AAA server 408 can maintain or access account information for users. For instance, for subscriber services, each subscriber account can specify the level of service for a user. Services can be offered to the user based upon the level of service purchased by or available to the user. Additionally, information regarding terminal requirements for various services can be maintained. For example, video service may be unavailable to terminals that lack the requisite video capabilities.

As described supra, in aspects, the AAA server 408 can utilize EAP to perform authentication of end devices 402. As will be understood, EAP refers to an authentication framework that allows many different authentication mechanisms and procedures. The various authentication mechanisms (e.g., EAP-TLS, EAP-SIM, EAP-FAST, EAP-AKA) can utilize passwords, shared keys and/or other credentials to establish identity.

Access to services provided by various application servers 406 can be controlled and secured by utilizing cryptographic keying material established by the AAA server 408. As will be appreciated, separate keying material can be generated for each service provided by an application server 406. For example, when a session is initiated, the AAA server 408 can evaluate services available to the device 402 based upon user identity, terminal capabilities, software availability and the like. The AAA server 408 can utilize user account information as well as information obtained during authentication to determine appropriate services.

As described above, a common issue in authentication/authorization operations today is that a device 402 does not know authentication and/or authorization status upon connecting to a network. In other words, the device 402 does not always know which application servers 406 have authorized access to the end device or device 402. Similarly, the level of authorization status is most often unknown to the device 402 upon authentication. In a specific example, a device 402 may fail authentication but may still have access to a network based remediation service. Moreover, in other aspects, the device 402 may authenticate successfully but may only be granted limited authorization to application servers 406, and resources (e.g., services, applications) managed therefrom. In yet other aspects, the authenticator may lose state in which case the device 402 or client 402 could possibly lose connection altogether.

Here, in accordance with the specification, the authorization management component 410 is capable of generating an authorization status message or notification to inform a client or device 402 of this state. For instance, the end device authorization state can be dynamically monitored by the authorization management component 410 whereby a message notice can be pushed to end devices 402 on an as-needed or as-desired basis. Further, the message notification request can be triggered (e.g., queried for) by the end device 402 (or other entity) on an as-needed or as-desired basis. While a specific query generation component is not shown, it is to be understood that most any suitable mechanism can be employed to generate a request or query for authorization status in accordance with aspects.

In all, the authorization management component 410 can provide authorization status information to an end device 402 (or other appropriate device, e.g., server) before, during or following the initial authentication and authorization operation. It will be understood that conventional systems are only able to provide limited information within the context of initial authentication. For example, with reference to EAP-FAST, there can be messages within a tunnel during authentication that can provide a hint with regard to authorization sent down to an authenticator. It is to be understood that this is not an explicit indication of network access but, rather a description of posture evaluation results. In contrast, the system is capable of providing meaningful and comprehensive information regarding authorization status. In aspects, this information can be employed to prompt action such as remediation, re-authentication, etc.

Moreover, this information can be communicated to, or by, the authenticator which may modify these states due to local resource constraints or policy. As described above, in conventional systems, limited information is only available at authentication time. However, the information available at authentication time is not comprehensive authorization status information. To the contrary, the subject authorization management component 410 enables a mechanism that provides an authorization indication to a device 402 (or other device) within or outside the scope of the authentication time and/or exchange. In other words, in aspects, this comprehensive indication can be provided outside of the scope of the initial authentication or subsequent re-authentication message exchange(s). This indication identifies the authorization criteria that a device 402 is being provided by an authenticator.

Figure 5:
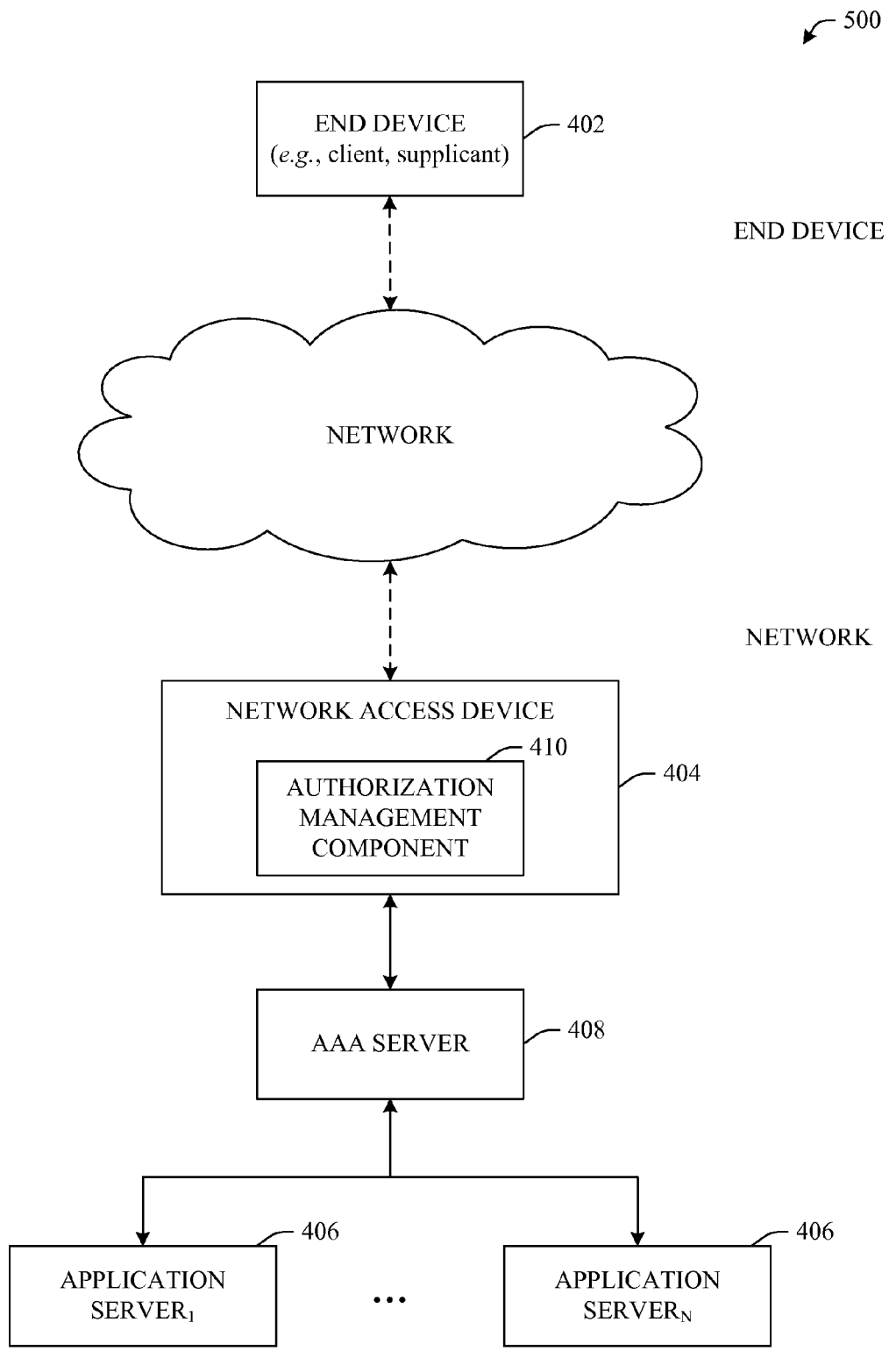
FIG. 5 illustrates a block diagram of an example system that embodies an authorization management component within a network access device (e.g., router, switch).
Figure 6:
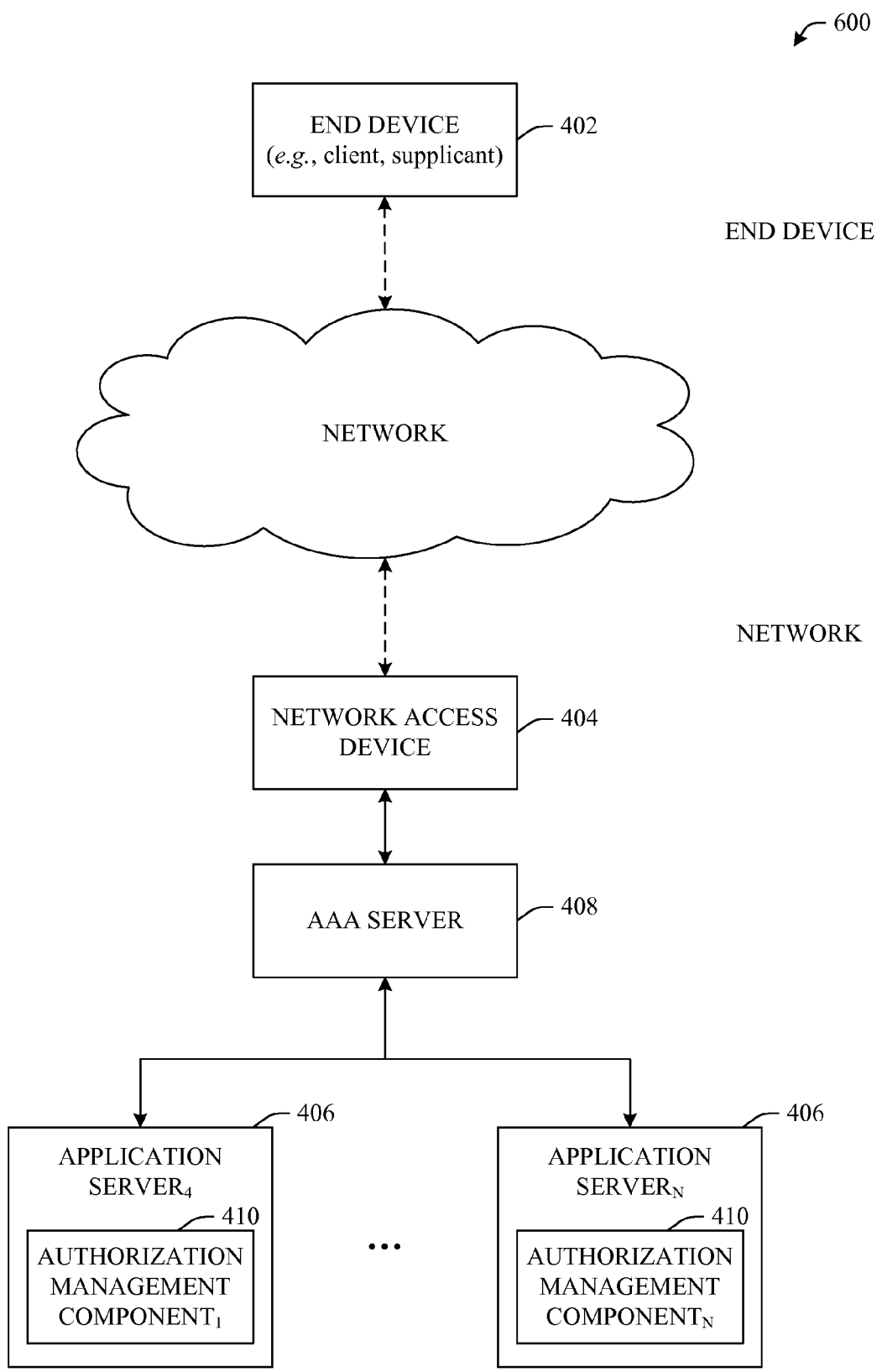
FIG. 6 illustrates a block diagram of an example system that embodies an authorization management component within each of a group of application servers.

In accordance with the subject specification, the AAA server 408, or 'authenticator' generally in this example, can relay a message to an appropriate end device 402 of a change in assigned authorization, e.g., network or resource authorization. It is to be understood that, in alternative aspects, each application server 406 can include an authenticator (not shown) which is capable of conveying the authorization status information to each end device 402. Similarly, the authorization management component 410 can be employed within the network access device 404 or application server(s) 406 as illustrated in FIGS. 5 and 6 respectively. These alternative aspects are to be included within the scope of this specification and claims appended hereto.

Alternatively, the end device 402 can employ a query response protocol (not shown) that triggers or prompts verification and/or validation of authorization status to all, or a subset of application servers 406 (as well as services supported thereby). In accordance with this specification, the authorization status information can include, but is not limited to include, any of the following: name/identifier of currently attached network, whether any communication is allowed, authorization profile name, whether provisioning is allowed, whether remediation access is allowed, reason for access restrictions, whether full access is allowed, whether limited access is allowed, type of access that is allowed or restricted, quality of service, lifetime of authorization, etc. In aspects, the authorization status message or notification can be carried in a specialized protocol or as attributes in an existing protocol including, but not limited to, DHCP (Dynamic Host Configuration Protocol), LLDP (Link Layer Discovery Protocol) (e.g., 802.1a,b), EAPoL (EAP over LAN) (e.g., 802.1X), EAPoUDP (EAP over UDP (User Datagram Protocol)), PPP (Point-to-point protocol), etc. While specific protocols are listed above, it is to be understood that other IP- and non-IP-based protocols can be employed in alternative embodiments. Accordingly, these alternative aspects are to be included within the scope of this specification and claims appended hereto.

As described supra, the device 402 can determine when its network authorization state changes. This determination can be dynamically or automatically pushed by an authenticator. In this example, the authorization management component 410 can dynamically monitor status and push the status as appropriate. Alternatively, the device 402 can query for, and receive, the information on an as-needed or as-desired basis.

In response to the status information, the device 402 can prompt appropriate action as a function of the status information. One key feature of the specification is that this information can be provided to the device 402 outside of the authentication exchange. Still further, the indication/information can be cryptographically protected to secure transmission. The features, functions and benefits described herein can increase usability of 802.1X and similar solutions.

Referring now to FIG. 5, an alternative block diagram of a system 500 is shown in accordance with an aspect of the specification. Essentially, the example block diagram of system 500 illustrates that authorization management component 410 can be employed within a network access device 404 or provider edge device. For example, the authorization management component 410 can be embodied within a router or switch in order to facilitate authorization notification in accordance with aspects of the disclosure.

In the aspect of FIG. 5, a router (network access device 404) can push status information to an end device 402. For instance, the authorization management component 410 can dynamically monitor network or application server authorizations. The authorization management component 410 can receive a signal from another entity indicating that a particular set of authorizations has changed. The status information can be provided to an end device based upon most any frequency. For example, the information can be provided upon detection of a change in authorization state. In other examples, the information can be provided upon receipt of a request from the end device 402. In other words, a user (or end device 402) can trigger notification.

As described supra, the authorization management component 410 can be used to interrogate an end device for capabilities (e.g., resources, software, specifications, viruses, malware) needed for authorization. Here, the authorization management component 410 can advise the end device of available authorizations, required actions (e.g., scans), etc. Essentially, the authorization management component 410 is capable of informing an end device of applications and services that are available for use based upon a current context.

FIG. 6 illustrates yet another alternative block diagram of a system 600 in accordance with an aspect. Generally, the example architectural diagram of system 600 illustrates that each application server 406 can employ an authorization management component 410. In operation, the aforementioned functionality of the authorization management component 410 can be employed within each application server 406.

While specific architectural system diagrams have been illustrated in FIGS. 4, 5 and 6, it is to be understood that these example block diagrams are provided to add perspective to the specification. Accordingly, these example block diagrams are provided to further illustrate some of the features, functions and benefits of the authorization management component 410. It will be appreciated that still other example architectures exist. For example, in yet other aspects, an authorization management component 410 can be deployed within the end device. In this aspect, the authorization management component 410 can establish authorization status (e.g., via dynamic monitoring). These alternative example architectures are to be included within the scope of this disclosure and claims appended hereto. Combinations of the described architectures may also be deployed.

Figure 7:
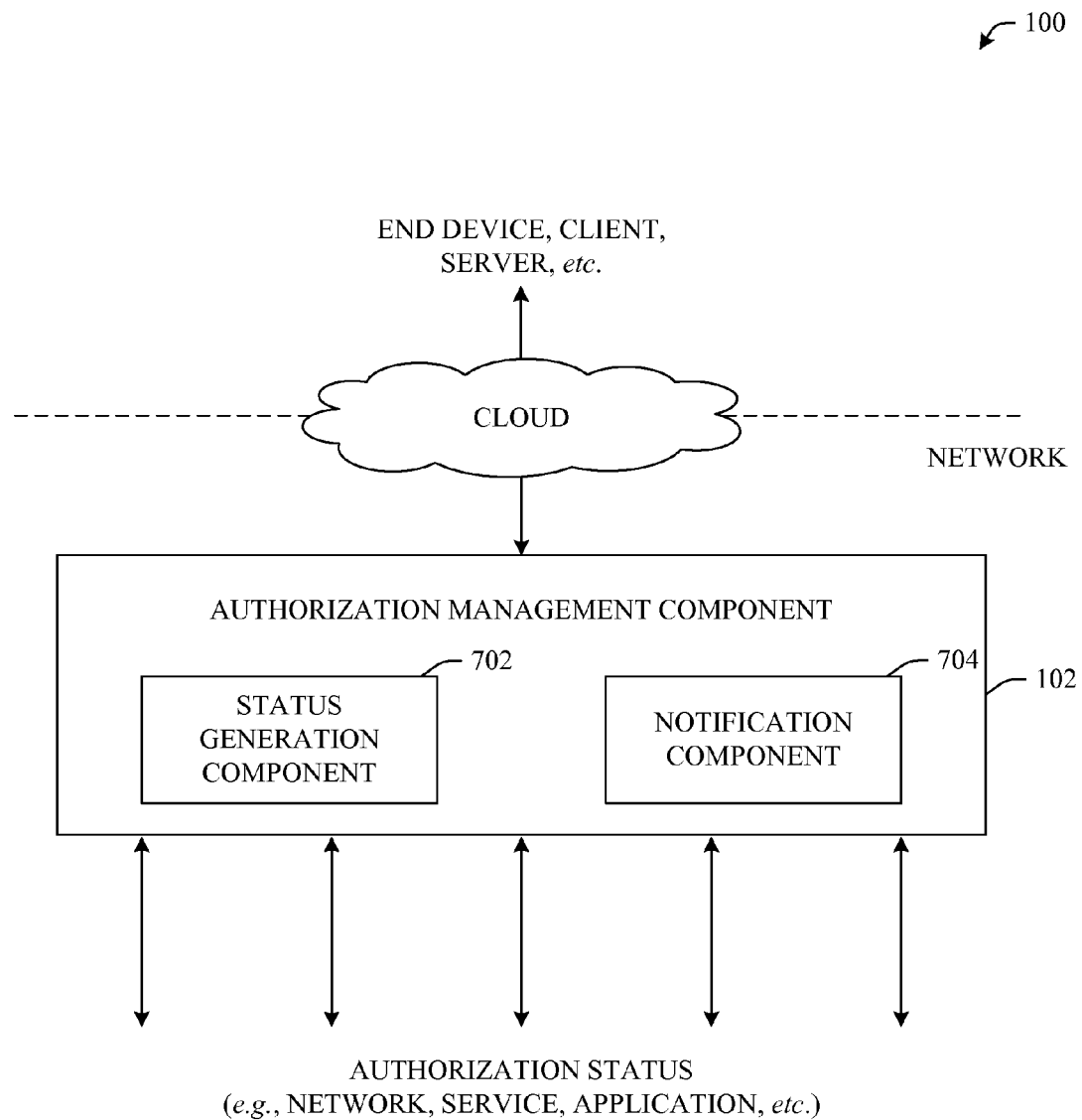
FIG. 7 illustrates an example block diagram of an authorization management component in accordance with an aspect.

Referring now to FIG. 7, an alternative block diagram of system 100 is shown. More particularly, as illustrated, the authorization management component 102 can include a status generation component 702 as well as a notification component 704. In operation, these sub-components (702, 704) can effect generation of an authorization status as well as notification of the status to a target or requesting entity (e.g., end device, supplicant, client device, server).

The status generation component 702 can actively monitor authorization status which, as described supra, can be defined by a network authorization as well as authorization(s) to resources within the network. For example, the status can be reflective of specific services or applications hosted by the network. The status can be a function of most any factor such as, but not limited to, authentication status, appropriate credentials, device specifications, virus presence, software availability, etc. The status may take into account information about a change in a set of authorizations or other parameters received from an external entity. Most any factor can be employed by the status generation component 702 to determine the authorization status in accordance with aspects.

The notification component 704 can efficiently and effectively deliver or otherwise convey the status to a target or requesting device. In one aspect, the notification component 704 can automatically push the status to the appropriate device or entity. In other aspects, the act of pushing the status can be triggered based upon a change in status or other desired parameter. In still other aspects, a device or entity can request status, thereby triggering the communication of status information.

Figure 8:
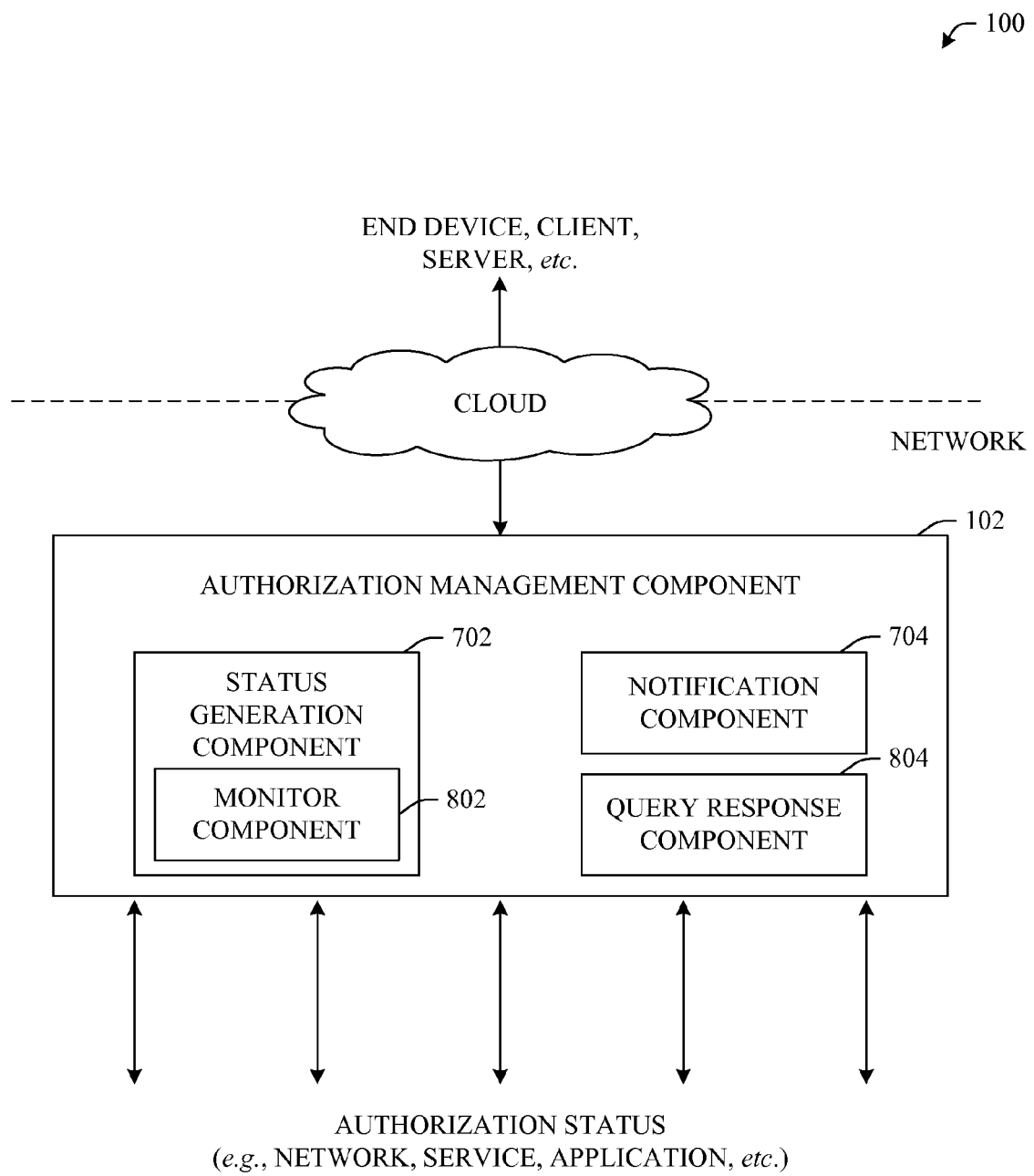
FIG. 8 illustrates an example block diagram of an authorization management component having a monitor component and a query response component in accordance with an aspect.

FIG. 8 illustrates yet another example block diagram of system 100 in accordance with aspects of the specification. More particularly, as shown in FIG. 8, the status generation component 702 can include a monitor component 802 that is capable of actively monitoring authorization. Additionally, the authorization management component 102 can include a query response component 804 that is capable of receiving a status request (e.g., query) from an end device, client, server or other entity.

The monitor component 802 is capable of assessing status as well as capabilities/criteria to establish status. For instance, in addition to determining a current authorization status, the monitoring component 802 is capable of detecting information such as virus presence, device specifications, software availability, etc. The monitor component may take into account information about a change in a set of authorizations or other parameters received from an external entity. This information can be used by the status generation component 702 to establish an appropriate status as well as to suggest, recommend or dictate action (e.g., remediation).

The query response component 804 is capable of receiving a status request from a device or other entity. While aspects of the specification employ automatic status notification (e.g., via the notification component 704), aspects can also employ user-, device- or entity-triggered status generation. Here, the query response component 804 is capable of receiving this information, processing the information and coordinating with the status generation component 702 and the notification component 704 to convey status as requested or appropriate.

It is to be understood that the status request need not originate at the device for which status is requested. For example, it is possible for a request to be generated from an enterprise server which requests the authorization of a particular client device or group of devices. While these aspects are not illustrated, they are to be included within the scope of the disclosure and claims appended hereto.

Figure 9:
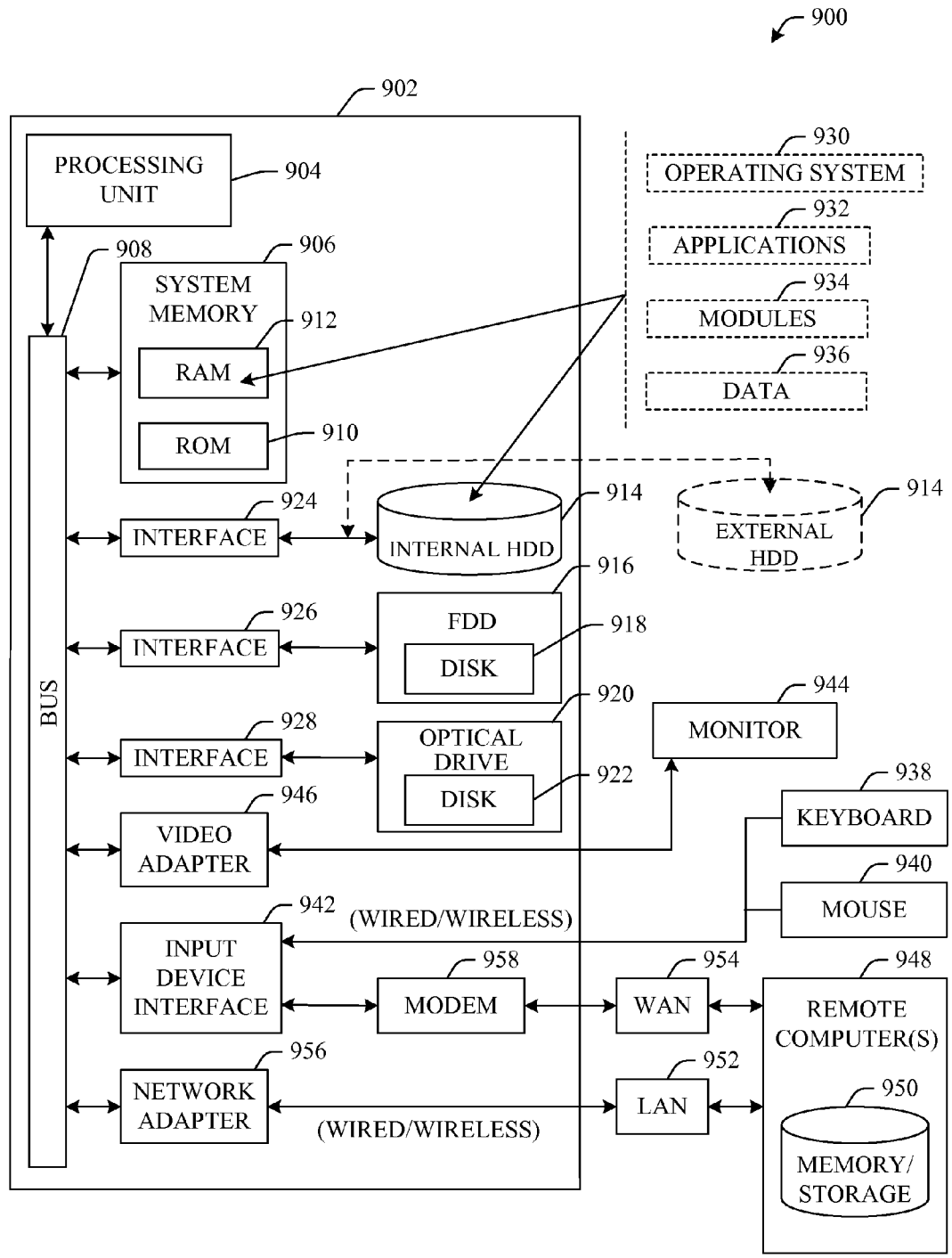
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject disclosure, FIG. 9 and the following discussion are intended to provide a brief, general description of a suitable computing environment 900 in which the various aspects can be implemented. While the specification has been described above in the general context of computer-executable instructions that may run on one or more computers, those skilled in the art will recognize that the systems (and methods) also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the specification includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject disclosure.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the specification.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the aspects can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi, WiMax, UWB (Ultra-Wideband) and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
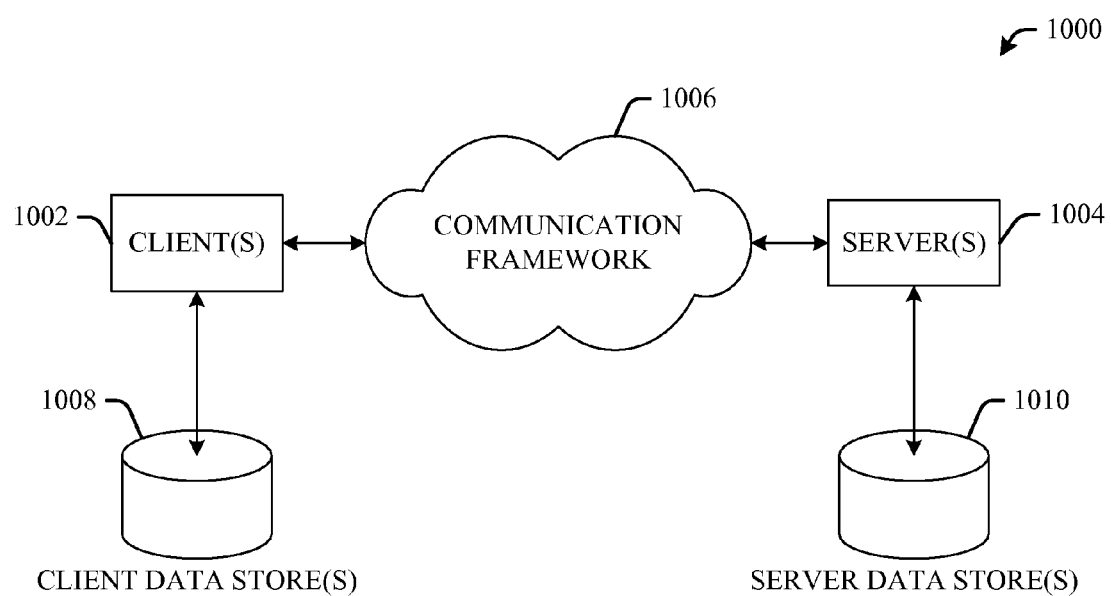
FIG. 10 illustrates a schematic block diagram of an example computing environment in accordance with the subject specification.

Referring now to FIG. 10, there is illustrated a schematic block diagram of an exemplary computing environment 1000 in accordance with the subject specification. The system 1000 includes one or more client(s) 1002. The client(s) 1002 can be hardware and/or software (e.g., threads, processes, computing devices). The client(s) 1002 can house cookie(s) and/or associated contextual information by employing the disclosure, for example.

The system 1000 also includes one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the specification. It is, of course, not possible to describe every conceivable combination of components or methodologies for purposes of describing the subject specification, but one of ordinary skill in the art may recognize that many further combinations and permutations of the specification are possible. Accordingly, the specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A method, comprising:
monitoring a plurality of network application services accessible to an entity;
authenticating the entity;
establishing authorization status of the entity, wherein the authorization status identifies a scope of access permission to a subset of the plurality of network application services provided by one or more application servers accessible to the entity;
subsequent to the establishing authorization status of the entity, receiving a request for an updated authorization status from the entity;
in response to the request, generating a notification message that includes the updated authorization status;
communicating the notification message to the entity;
dynamically monitoring authorization status of the entity; and
triggering the act of communicating based upon identifying a change in the authorization status, wherein the notification message further comprises a remedial measure to address the change in the authorization status.
2. The method of claim 1, wherein the notification message includes at least one of network name, authorization profile name, communication permissions, provisioning permis- sions, remediation permissions, access permissions, type of access permission, quality of service, scope of authorization, or reasons for restrictions.

3. The method of claim 1, further comprising cryptographically protecting the request or the notification message.

4. The method of claim 1, further comprising triggering an action based upon the notification message, wherein the action is at least one of communication, remediation, re-authentication, enrollment, complete rejection, or limited rejection.

5. The method of claim 1, further wherein the act of communicating employs incorporation of the notification message as an attribute in at least one of a DHCP, LLDP, EAPoL or EAPoUDP message.

6. The method of claim 1, further comprising communicating the notification message to a disparate entity.

7. The method of claim 1, wherein the plurality of network application services comprises a telephone application to the entity, and wherein the authorization status comprises a scope of access permission to the telephone application of the entity.

8. The method of claim 1, wherein the plurality of network application services comprises a mobile device communication service to the entity, and wherein the authorization status comprises a scope of access permission to the mobile device communication service of the entity.

9. A system, comprising:
a processor;
a memory;
a real-time status generation component of a processing device configured to operate with the processor and memory to determine real-time authorization status of a client at a point subsequent to authorization status being assigned to the client, wherein the real-time authorization status identifies a scope of access permission to a subset of the plurality of network application services provided by one or more application servers accessible to the client; and
a notification component of the processing device configured to operate with the processor and memory to, subsequent to authorization of the client, generate and convey a message to the client, wherein the message includes the real-time authorization status, dynamically monitor authorization status of the entity, and trigger an act of communicating a notification message based upon identifying a change in the authorization status, wherein the notification message further comprises a remedial measure to address the change in the authorization status.

10. The system of claim 9, further comprising a monitoring component that dynamically monitors the authorization status of the client.

11. The system of claim 9, wherein the message is a post-authentication notification.

12. The system of claim 9, wherein the message is triggered as a function of a change in the authorization status.

13. The system of claim 9, wherein the notification is triggered as a function of a request from the client.

14. The system of claim 9, the authorization status includes at least one of network name, authorization profile name, communication permission, provisioning permission, remediation access permission, scope of access permission, type of access permission, quality of service, lifetime of an authorization or reason for restrictions.

15. The system of claim 9, further comprising query response component that evaluates a request from the client, wherein the notification component triggers transmission of the message as a function of the request.

* * * * *